(12) United States Patent
Hassavari

(10) Patent No.: US 9,091,246 B2
(45) Date of Patent: Jul. 28, 2015

(54) DEVICE OF A POWER PLANT

(76) Inventor: Nader Hassavari, Trondheim (NO)

(*) Notice: Subject to any disclaimer, the term of this patent is extended or adjusted under 35 U.S.C. 154(b) by 315 days.

(21) Appl. No.: 13/518,937

(22) PCT Filed: Dec. 17, 2010

(86) PCT No.: PCT/NO2010/000471
§ 371 (c)(1),
(2), (4) Date: Jun. 25, 2012

(87) PCT Pub. No.: WO2011/096816
PCT Pub. Date: Aug. 11, 2011

(65) Prior Publication Data
US 2012/0261923 A1 Oct. 18, 2012

(30) Foreign Application Priority Data

Dec. 23, 2009 (NO) .................................. 20093591
Apr. 23, 2010 (NO) .................................. 20100589

(51) Int. Cl.
| F03B 13/00 | (2006.01) |
| F03B 13/12 | (2006.01) |
| F03D 9/00 | (2006.01) |
| F03B 13/18 | (2006.01) |
| F03B 13/20 | (2006.01) |

(52) U.S. Cl.
CPC ............ *F03D 9/008* (2013.01); *F03B 13/1845* (2013.01); *F03B 13/20* (2013.01); *Y02E 10/38* (2013.01); *Y02E 10/725* (2013.01); *Y10T 428/13* (2015.01)

(58) Field of Classification Search
USPC ................................................ 290/44, 53, 55
See application file for complete search history.

(56) References Cited

U.S. PATENT DOCUMENTS

| 3,697,764 | A | * | 10/1972 | Stanziola et al. ............... 290/42 |
| 4,248,004 | A | * | 2/1981 | Trotter ......................... 43/54.1 |
| 4,408,965 | A | * | 10/1983 | Ekstrom ....................... 417/331 |
| 4,599,858 | A | * | 7/1986 | La Stella et al. ............... 60/497 |
| 4,792,290 | A | * | 12/1988 | Berg ............................ 417/332 |
| 5,359,229 | A | * | 10/1994 | Youngblood .................. 290/53 |
| 6,208,035 | B1 | * | 3/2001 | Kao .............................. 290/42 |
| 6,389,810 | B1 | * | 5/2002 | Nakomcic ..................... 60/502 |
| 7,759,814 | B2 | * | 7/2010 | Oigarden ...................... 290/53 |
| 2003/0137150 | A1 | * | 7/2003 | Shu .............................. 290/54 |
| 2007/0009325 | A1 | * | 1/2007 | Oigarden et al. ............. 405/75 |
| 2008/0018114 | A1 | * | 1/2008 | Weldon ......................... 290/53 |
| 2010/0264659 | A1 | * | 10/2010 | Chi et al. ....................... 290/53 |
| 2012/0139261 | A1 | * | 6/2012 | Dick et al. .................... 290/1 C |

FOREIGN PATENT DOCUMENTS

| DE | 44 23 454 | 2/1996 |
| ES | 2 182 702 | 3/2003 |
| WO | WO 2004/065785 | 8/2004 |

* cited by examiner

Primary Examiner — Tulsidas C Patel
Assistant Examiner — Thomas Quigley
(74) Attorney, Agent, or Firm — Ladas & Parry LLP

(57) ABSTRACT

A power plant device for the production of energy in the waves by the use of float devices, the motion of which is used to power generator to produce energy, and means of conveyance of energy to further use, the device having a rig that is directed to float in the sea by means of a float supporting construction with the floats in the water line so that these may be affected by wave motion in the sea, and where the floats are arranged in a ring shape around the rig's circumference with spacing between the floats, which floats independently of each other are oriented to engage their respective generators via a transmission system, and the rig is anchored to the seabed via a cable.

14 Claims, 17 Drawing Sheets

Framework below deck 1

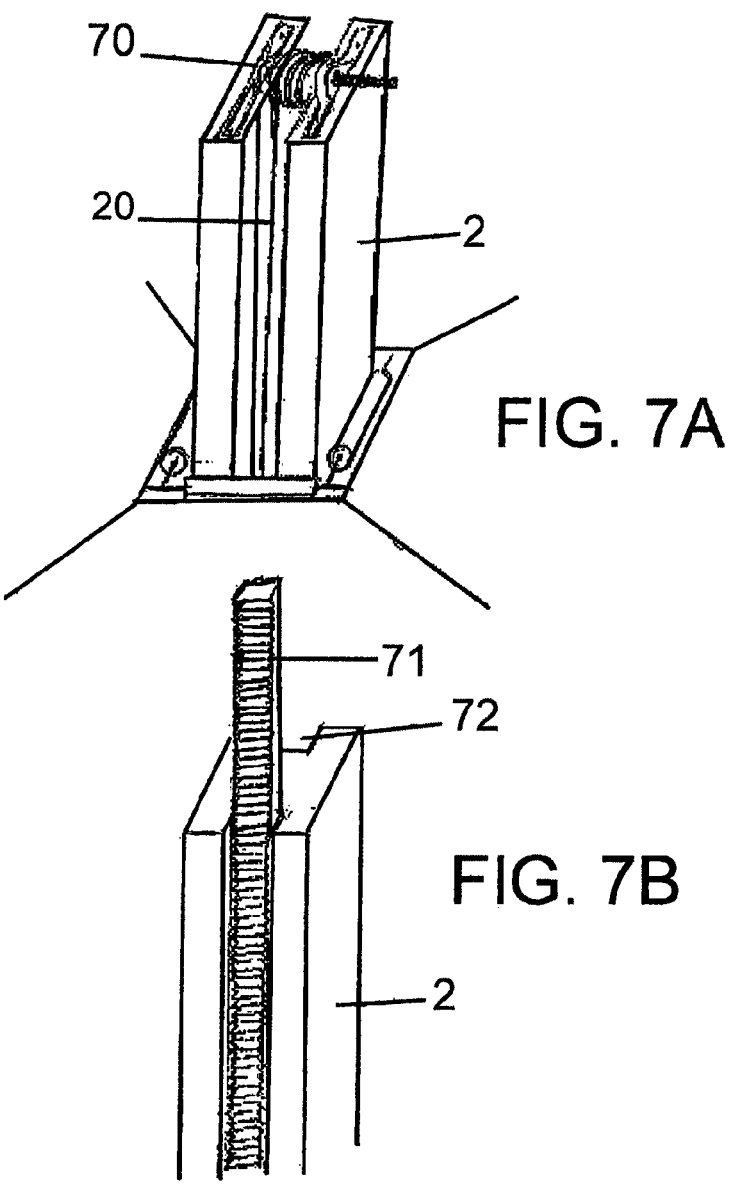

DEVICE OF A POWER PLANT

This application is a 371 of PCT/NO2010/000471, filed on Dec. 17, 2010, which claims priority to Norwegian patent application number 20093591, filed Dec. 23, 2009, Norwegian patent application number 20100589, filed Apr. 23, 2010, and which are incorporated herein by reference.

The present invention relates to a construction to exploit the powers of waves and possible wind to produce kinetic energy to power a generator in order to produce energy which in turn can be used commercially. The invention also applies to the construction of a float to the wave power plant.

The invention concerns a float for installation in a wave power plant as indicated, where the float is brought to move back and forth via a transmission to drive a generator to produce energy for further exploitation.

The construction of the present invention is mainly based on the transfer of kinetic energy, which is created when a float is moved by wave action, transmitted in a mostly fixed vertical in relation to the plant via a drive, to a power-producing generator, such as via a chain, strap or toothed rack to a gear wheel which then in turn drives said power-producing generator.

With regard to the prior art many structures of the above type are known, and reference is made to the following patent publications: U.S. Pat. Nos. 1,816,044, 953,600, 6,574,957B2, 961,401, DE-80253, FR2511087, WO 2008/084507, WO-2009/034402, FR-2423651, WO-2009/013766 and DE-4423454 A1.

These patent publications shows inter alia various forms of wave floats for wave power plants, pumping plants, etc., and more detailed structures of float structures with concave and conical shapes.

The aforementioned patents are different proposals where float movements are transmitted in the vertical direction by a pinion of a gear which drives a generator.

Moreover there is referred to the second last two publications WO-2008/084507, WO-2009/034402 showing the wave power station consisting of a rig to which it is mounted a wave floats that are used in a system to produce kinetic energy in pneumatic pistons that produce energy which is stored as compressed air in closed tanks at the movement of an elongated body in back and forth direction.

The last-mentioned DE-4423454A1 has some similarities with the present new construction, but there are also significant differences as follows.

1. It lacks a flow tank or main float in the central part which is necessary to carry the whole structure and keep it in the correct position in the sea.
2. The German solution prescribes that there are the joint movements in all directions in the attachment point between each float and framework, which is completely different from our construction wherein floats undergoes motion in the vertical direction relative to the rest of the structure via a rod.
3. The German solution lacks a strong truss-frame to hold the base to the whole design together and ensure that the structure will not disintegrate, at the same time as it does not allow the floats to move sideways and destroy the structure.
4. The floats according to the invention is designed to minimize the sideways hitting between the waves and float so that the energy in waves does not move the float sideways. The floats to the latter DE-4423454A1 is designed so that it will absorb the energy of waves to move laterally, i.e. in contrast to the present solution.
5. When we study the lastmentioned DE-4423454A1 and compares with the present construction, it is clear that it is designed and based on completely different principles.
6. The present invention is concerned with how the wind turbine is combined with and adapted to the wave power plant construction, and not on the windmill in itself.

From the above FR-2423651 and WO-20091013766D9 describe that also wind energy can be used for energy production in such wave-based installations.

With the present invention, one takes a view to produce a completely new design based on the above known solutions.

Furthermore, one takes a view to produce a solution which in addition to extracting energy from wave power, also be able to utilize wind power to enhance the effectiveness of energy catchers in the waves, especially in that the plant/rig is brought to pivot so that electricity can be produced when there is too little waves and more wind.

Furthermore, one takes a view to produce a variant with a solution where in addition to extracting energy from wave power, also may be able to utilize wind power in a wind turbine design so that it can produce power when there are less waves and more wind.

There is also a purpose of the invention to produce a new construction of a rig in the form of a float tank, to which the said energy-producing floats can be connected.

There is also a purpose of the invention to produce a new design that can be combined with a windmill and a simpler solution to the placement of a wind mill in the sea.

There is also a purpose of the invention to provide for design and operational solutions that can make the construction producing energy at all weather conditions.

There is also a purpose of the invention to produce a way to anchor the structure to the seabed in a simple, robust and secure manner.

It is further an object to produce a way of securing the structure against damage under strong environmental influences.

The design for the production of energy based on wave and wind, and the device according to the invention, is characterised by a rig designed to float in the sea with a float supporting construction with the floats in the water line so that these may be affected by wave motions of the sea, and where the floats are arranged in a ring shape around the rig's circumference with mutual distance between the floats, where floats, independently of each other, are arranged to operate their respective generators via a transmission system, and the rig is anchored to the seabed by a cable.

The preferred designs of the structure are evident from the following description.

The float according to the invention, and the wave energy device are described below.

A significant feature of the present invention is that the rig construction is attached to the seabed, and that the produced electricity can be transported via an appropriate cable from the rig's operating systems, down to the seabed, further on to land or other application.

It is also an essential inventive feature is that the rig's attachment to the seabed includes a winch system designed to always keep the floats at the correct height position in relation to tide level and securing the plant in the storm.

The invention will in the following explained with reference to the accompanying figures, wherein:

FIGS. 7a and 7b show details of construction.

Figures 1A, 1B, 1C:
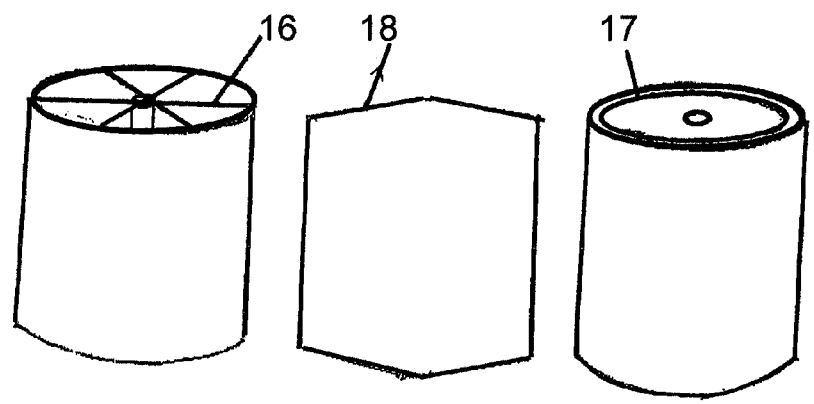
FIG. 1a, 1b and 1c show various structures of the float tank.
Figure 1:
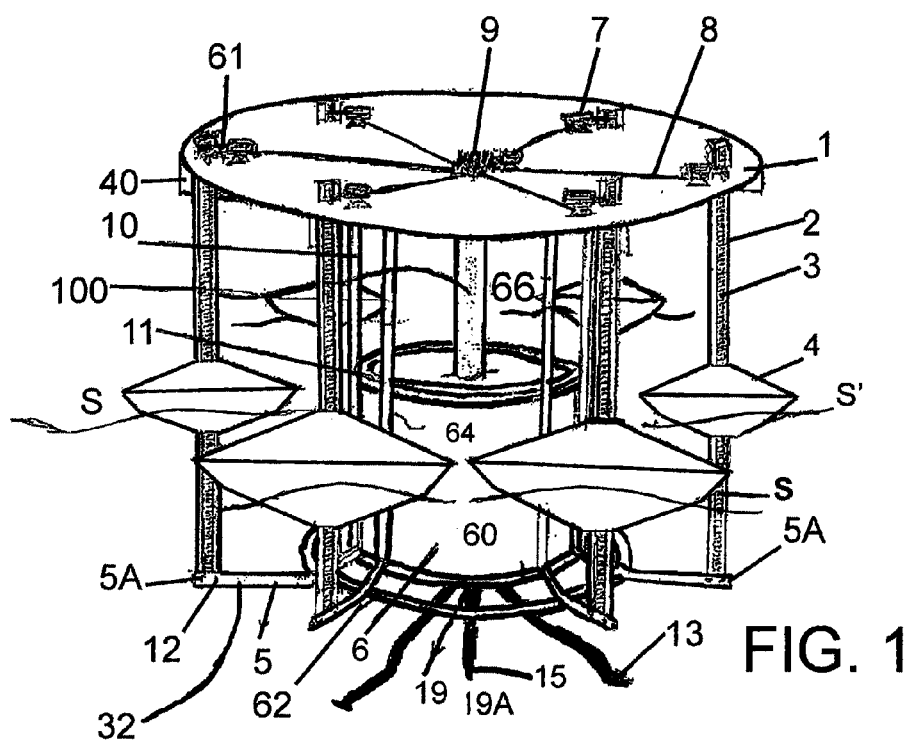
FIG. 1 shows an illustration of a wave power plant mounted on a location in the sea.

Initially reference is made to FIG. 1 showing a perspective of a wave power plant according to the invention which is installed to operate in waves in the sea.

The plant consists of a basis of a generally horizontal plate 1. A central float chamber is 6 arranged on the underside of the plate 1 and holds the whole system afloat, in the form of beams under the panel 9. Along the perimeter are mounted a number of vertical rods 3 which rises down under the plate at a distance from the center axis, organised around the circumference of the disc 9. The upper end of the rods 3 is attached to a plate 1 of the frame and up to the top side of the disc 1 in which the generators 7, one for each rod is suitably located and installed in properly designed housings. The rods 3 is mainly set parallel to each other and in parallel to a central shaft 100 projecting centrally beneath the cover plate 1. Each rod 3 is connected to a float 4 which is structured to move up and down on its rod as a result of wave impact, to rotate its respective generator 7 of the deck 1.

The rod 3 and the shaft 100 is attached to a framework extending down under the deck plate 1. The frame consists of ring shaped lower frame parts 60.62 which connects mutually parallel vertical beams 10, FIGS. 3, and 64,66 FIG. 1, so they form a ring shape that surrounds the floating tank mounted to the shaft 100. At the bottom, mainly horisontal radially beam sections 5,32 (FIG. 3) extend, that forms the outer anchoring seat for the float beams 3.

The rig is designed to float in the sea by means of a central float chamber 6, mounted into a truss framework 10,32.

From the bottom of the framework 10,32, a connecting cable 15, see FIG. 1, extends down to a fixture in the seabed. The others loose or suspending cables 13 shown in FIG. 1, represent safety cables and have no direct function or is no part in the operation of the rig. They are only spare fasteners that keep the rig in place if the fixing cable 15 breaks.

Figure 2:
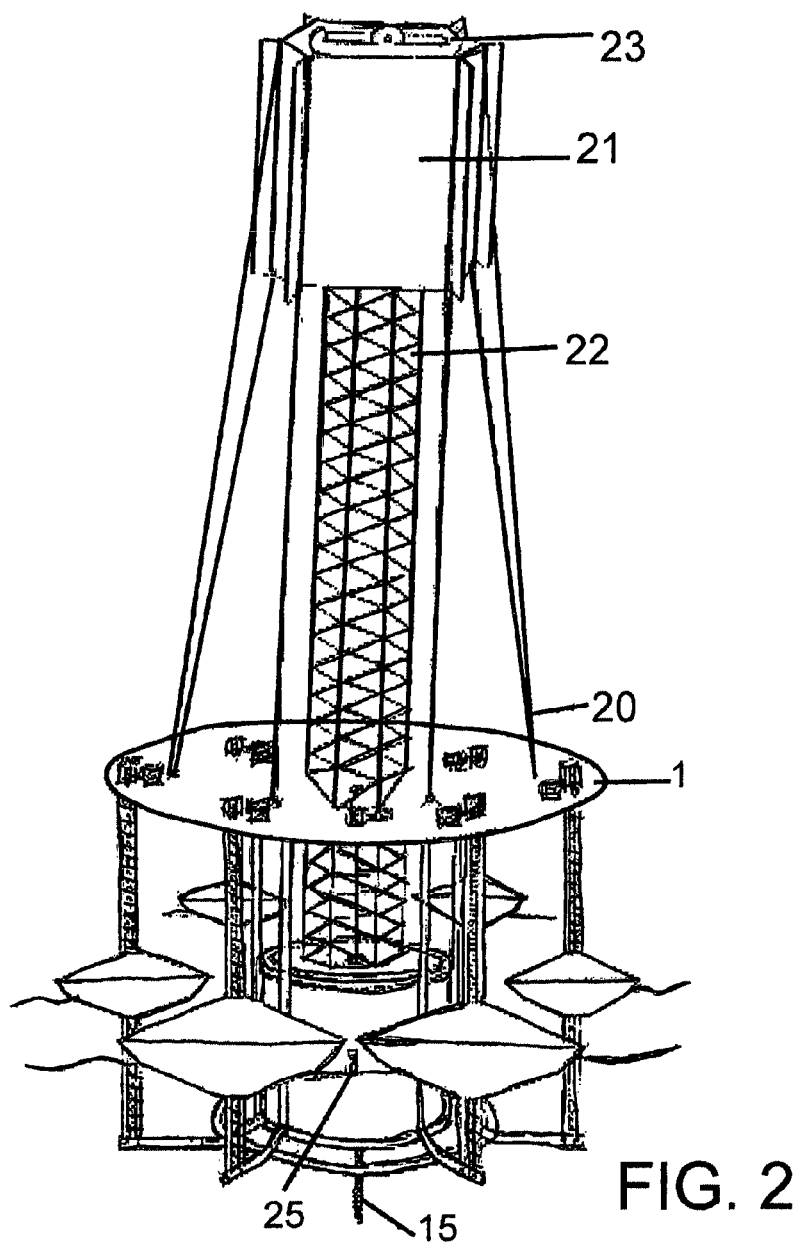
FIG. 2 shows a construction of a combined wind catcher and float unit that can winched up and down along the rig's tower.
Figure 11:
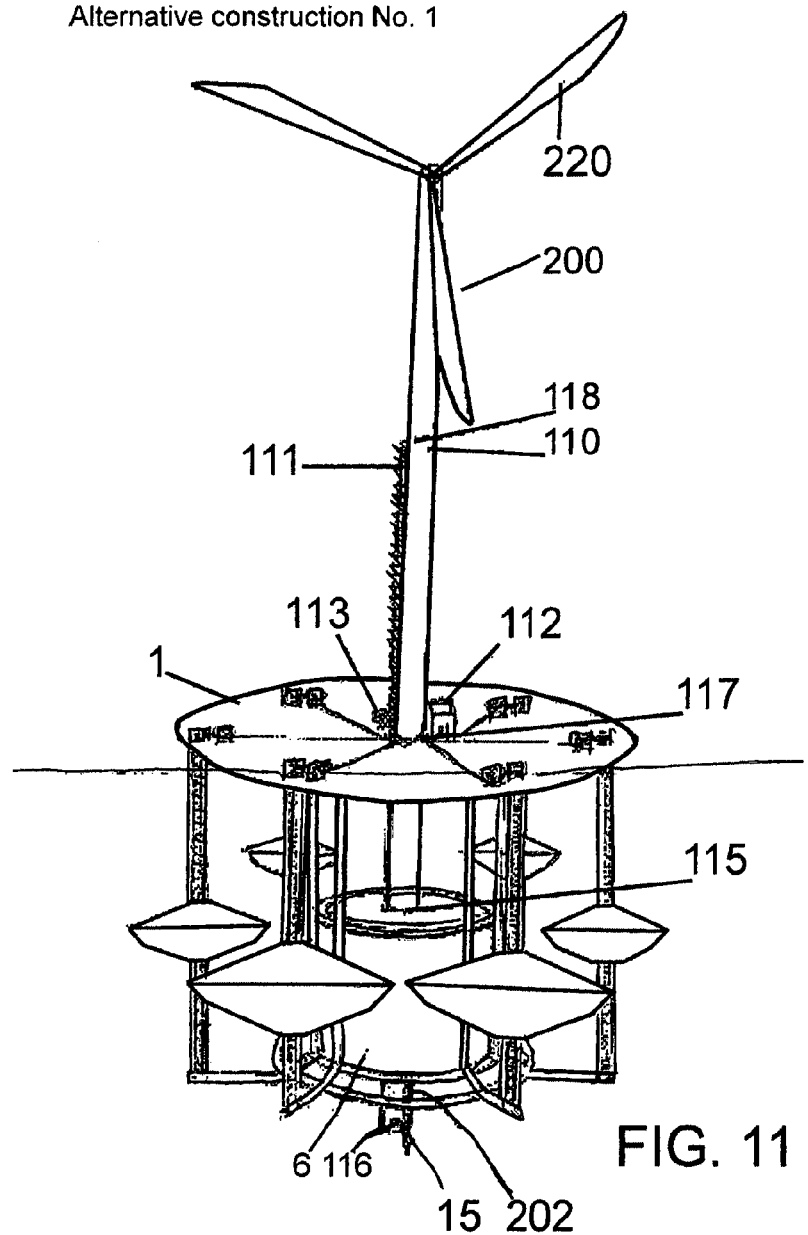
FIG. 11 shows a rig with a windmill, and how the wind turbine mast is mounted to the rig.

FIG. 2 shows that upwards from the rig plate a tower 22 raises and which is adapted for installation of a wind catcher, or a windmill as shown in FIG. 11. A wind catcher 21 can be pushed/rolled up and down along the frame work tower 22 by means of a wire 1 which is attached to the wind catcher housing 21, and running over a pulley No. 50, see FIG. 5, and attached to a motor winch No. 54. The wind catcher may slide up and down along the tower by means of pulleys No. 52 that is connected to pulley bearings No. 53 that is mounted to the wind catcher.

On top of the wind catcher a float element is mounted in the form of a tubular tank 23 which ensures that the construction remains float, i.e. to prevent the construction from turning over upside down in the sea in case of breakdown, i.e., it is to ensure that the construction will remain partially flat on the sea.

As shown in FIG. 2 the float element is hexagonal cubic with a central opening to accommodate the tower 22. The float element surface 21 is the surface facing or turned towards the wind and the folds No. 55 makes the surface forming an air pocket that the wind can take hold in.

By means of a winch 9 shown in FIG. 1 on top of the plate 1, the rig float tank 6 height position may be adjusted up and down along the central rod/shaft 100 so that the rig can have a correct vertical/upright position with the floats 4 in the sea surface shown by S-S' in FIG. 1, and so that with minimal effort from waves or wind can start to swing back and forth to promote energy production. If, for example, the rig is lowered further down in the sea, then it will be needed more wind power to swing the rig out of its vertical position. This means less pivoting and ultimately less effect on all floats.

Moreover, the cable 15 is winched in so that the rig may be pulled some down into the water if weather conditions allows for it, which will protect and increase the rig's stability at sea. The advantage is that the rig is a little slower to pivot back and forth, and one can avoid the whole rig tips over, or takes an unwanted extra slant in relation to the vertical position if it is affected by large wind forces.

A further advantageous feature of the invention, it is that the wind catchers of the rig peak can bring sufficient non-stability to the rig, so float is in motion and contributes to energy production.

Moreover, it is in the top of the rig, especially integrated within the wind catching section, arranged a float element 23 in the form of a float which helps to prevent the top section of wind catcher end up under water and capsized rig if the mooring to the seabed ruptures and the rig settles down.

It is particularly preferred that the combined unit wind catcher/float switch is mounted to a carriage, such as encloses the tower and can slide up and down along a vertical rail along the tower construction.

This feature that the rig can be dragged into the sea or brought to be raised, makes the rig's behavior be well regulated when operating. The further rig according to the invention is drawn down into the water the more stable it is, and the greater the resistance will be against the rig's pivoting movements. The depth of the rig can be adjusted by winching the bottom cable in or out.

If the rig is designed to operate in relatively shallow waters offshore, the cable lengths that are controlled by the operation of the winches, can be set with clock-based control (timer) or a sensor 25 associated in the float tank 6, see FIG. 2, which follows the water surface in the ebb and flow and turns on and off the tension and slack of the fastening cable 15 shown in FIGS. 1 and 2. Thus when the tide is rising, the winch slackens out cable 15, and when the tide is ebbing, the winch 9 coils the cable 15 back onto the drum. In this manner the rig can be set in the same upright position in the sea, or set in different height positions in relation to the waterline S-S' if desired.

In some alternative designs that only exploit wave impact to produce the power, there is no need to slack or tighten of cable attachment.

It is a particularly preferred embodiment that the construction of the float or the float tank is assembled with a mast construction for a windmill, as shown in FIG. 11

One can design the structure with the desired number of floats around the central float tank 6

FIG. 1 shows an illustration of a wave power plant in this case 6 floats (one may select the number of floats) mounted on a positioning in the sea. The deck no. 1 is mounted on framework that in page 4 FIG. 4 protrudes out from the center to the circumference and is attached to their respective leader rods and float where the lead rods (float rods) 2 go through nr. 41, see FIG. 4, and runs upward on the deck 1, FIG. 1, where the generator 7 is connected to a shaft 61 and gear driven by the belt 4 by means of a wire, chain or a rack as possible alternatives.

The lead rods 2 are in lower edge attached to its respective beam 32 of the rig's chassis. As indicated in FIG. 1, when the waves hit and lift up the float 4, the floats will to pull with them (chain, strap, wire rack) 3 which is mounted on the guide rod 2 to turn the pinion that is connected to the generator 7 which thereby will produce electricity.

The produced electricity is transported via the cable 8 on top of the deck plate 1, forward to the middle of the plant and via the float tank rod 100 internal channel in the middle down to the seabed and to shore through a power cable.

As shown in FIGS. 1A, 1B, 1C, the float tank 6 according to the options, has concave and convex top and bottom and they are divided with partitions inside or double wall to ensure the plant from sinking into the sea in case of float tank 6 becomes damaged or punctured.

FIGS. 2 and 11 show as mentioned a preferred embodiment of the construction according to the invention and a tower with a wind catcher, or a tower with a windmill.

In the option in FIG. 2, where the power will be produced based on the combination wave and wind power, it is important that the flow tank 6 is sufficient large in volume, so it can carry the whole structure that is (that the buoyancy capacity is greater than the forces which the float tank withstand when it is pressed down) and so that it can be adjusted so that it can easily flip from side to side. If the float tank is so large that the structure becomes stable so that wind power is unable to pivot the structure, or most of the energy is used to tilt it, there is little strength left to exploit, then one cannot get any power from wind forces.

In the scenario with the windmill in FIG. 11, one can choose a large float tank that is very stable and one can mount multiple wind turbines onto one and the same rig construction.

Figure 3:
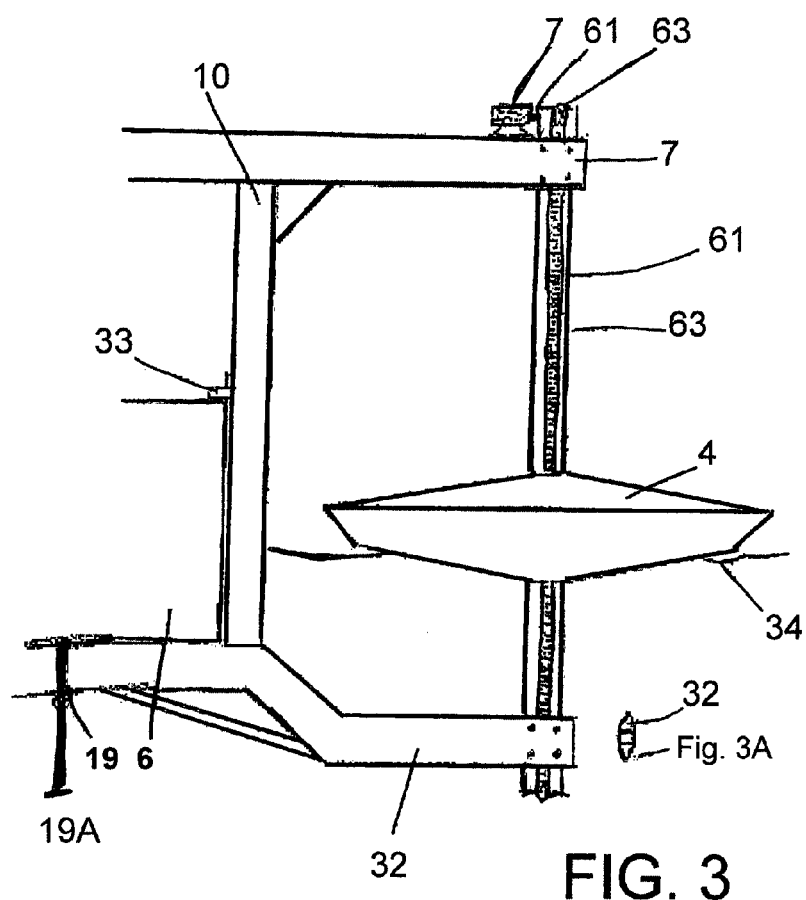
FIG. 3 shows an enlarged perspective of one of the floats and its connection to framework of the rig.

FIG. 3 shows a preferred embodiment of the lower structural part (base) of the wave power plant where the float 4 and the rod guide 2 and one of the beams under the deck No. 31, and one lower beam 32 of the rig is mounted together FIG. 3A shows a cross section of how the beams and braces of the structure can be designed to minimize the flow resistance during movement of the sea. One double-spaced framework with mutual distance and a framework above and below, is a good option too. In FIG. 3 it is shown how float No. 4 is mounted and how the energy production takes place. The conducting rod 2 with a chain or strap 3 that goes through the float 4 is fixed between two beams 31 respectively 32 arranged in different vertical heights. A wave can then hit the float 4 and will lift it upwards along the rod 2, and chain, strap or wire 3 which is attached to the float on one side inside can move upward and rotates the sprocket 63 and produces electricity. When the float drops down the weight (mass including any ballast mass inside the float) is exploited to rotate the same sprocket and the generator will continue to produce electricity.

Figure 4:
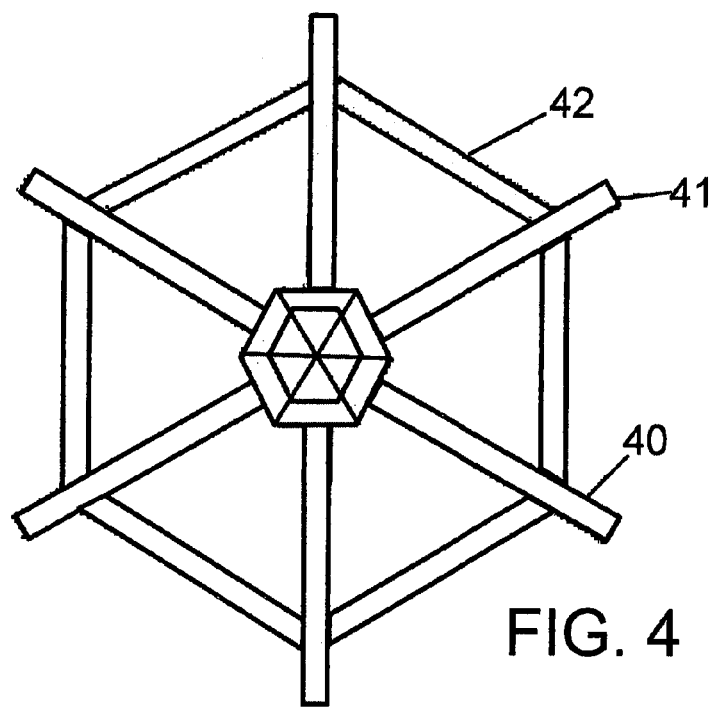
FIG. 4 shows the framework or framing below the deck of the rig.

FIG. 4 shows the framwork below the deck 1 in FIG. 1 and it is almost identical to the framwork of the base and the beam 40 represent the struts that holds the framework and the whole rig stable and prevents lateral movement of the beams. Reference number 41 shows the opening where the H-shaped guide rod 2 with the strap or wire or rack rises upward on the deck 1 where it is connected to the generator 7 via a shaft 61 (FIG. 6) and gears 63.

Figure 5:
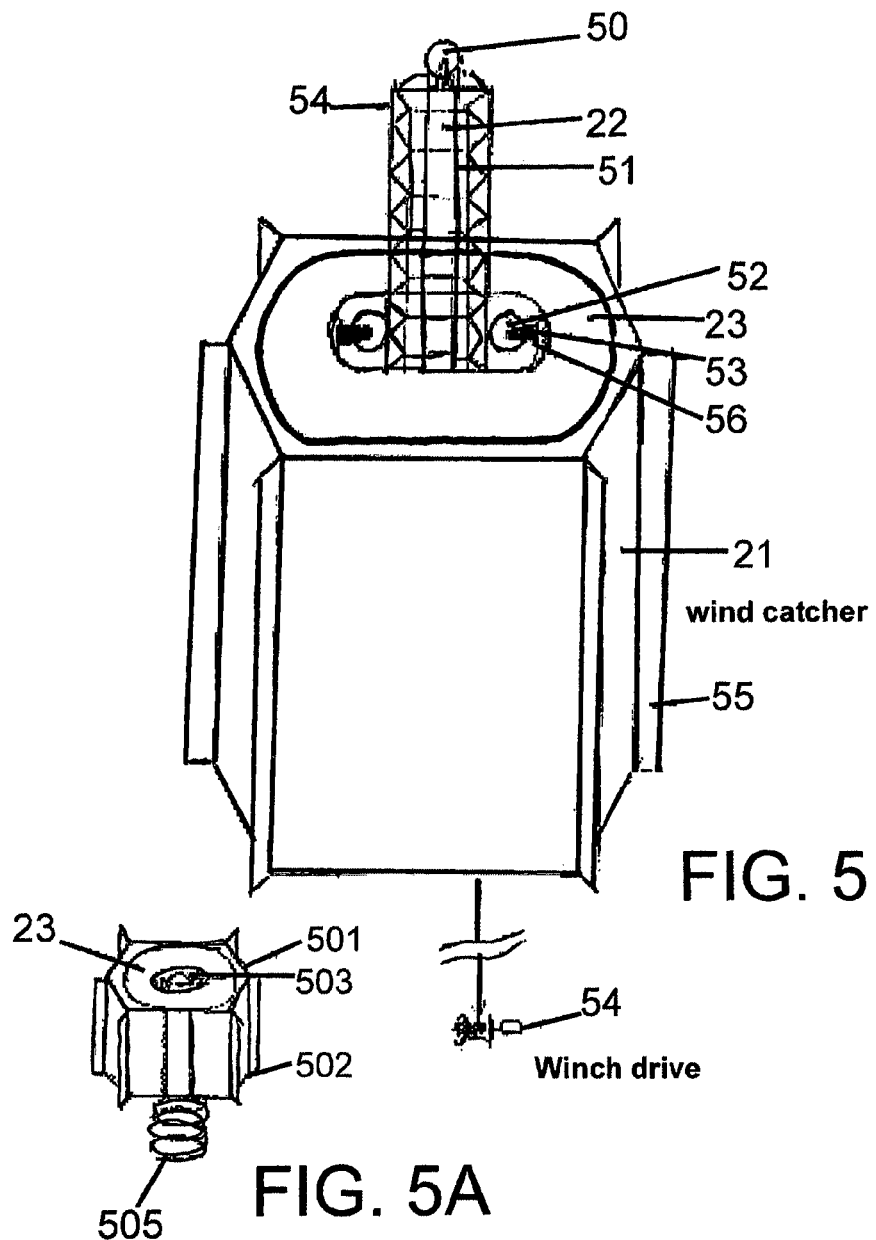
FIG. 5 shows details of the design of the wind catcher and its connecting to the tower.

FIG. 5 wind catcher that can roll up and down on framework tower No. 22 (FIG. 2) by means of pulley 50 and cable 51 drawn by the motor winch 54 and drawn up and down the tower by means of pulleys No. 52 that is connected on pulley bearing No. 53 that is mounted to the wind catcher.

There is mounted a tubular hollow tank 23 on top of the wind catcher in order to prevent the the construction from overturning up down in the sea in case of breakdown and ensures that the construction will remain at sea level.

The wind catcher surface 21 facing the wind and the extending flapsene 55 makes the surface to a wind pocket so that the wind catcher more strongly is affected by the wind.

FIG. 5A shows an alternative construction. In cases where wind pressure is fairly constant and strong, one mounts a strong spiral spring 505 under the wind catcher 501 which is in turn is mounted on a framework tower or a mast to pivot and turn back to take maximum advantage of the wind power and to prevent that the construction in case of a constant strong wind, are left oblique and exhibits a lower performance in terms of energy production.

According an alternative shown in FIG. 5A, the mast of the truss construction is replaced by a rod-shaped mast 503. It comprises an upper horizontal framework 501 with connected tank 23 and a lower horizontal frame work 502 mounted so that the wind catcher/framework 501 can be rolled down the pole/mast 503 that extends in the middle of the two frameworks and lie on the framework 502 if one wants to block the wind catcher function similarly to folding an umbrella. Specifically, the framework and wind faces can be folded.

The wind catcher Material may be of canvas that is used sailboats, as the canvas is fastened and tensioned between the two frameworks 501 and 502

Figure 6:
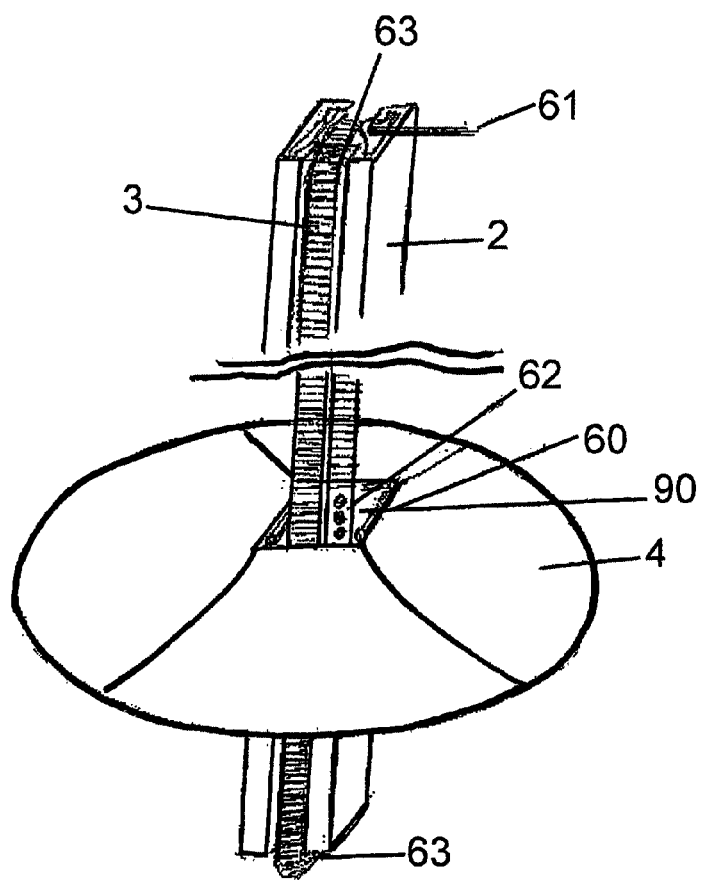
FIG. 6 shows the FIG. 3 of an enlarged view of the float and the toothed belt that moves in a loop around the pole, and whose motion generates electricity in the generator.

FIG. 6 shows how each float switch is installed with the belt 3 and the strap is mounted around a guide rod 2 (float rod in the rig under the deck plate 1) and is installed gears on the ends of the guiding rod and rolls on the guiding rod and is free from. one side but is attached to float 4 from the other side, inside the rod chamber 90 in the middle of the float at No. 62. The float moves therefore freely along the rig stationary rod 2, and is attached to the strap 3 and pulls it upwards and downwards to power the generator shaft 7 61. In the embodiment on FIG. 6 the float 4 pulls the belt up and down.

The H-shaped rod is mounted through the center of the float and the float rolls in several oblong wheel bearings 60, see FIG. 2, which is fitted into the rod chamber 90 on the ends. At the top and bottom of the H-bar is mounted a sprocket wheel 63, FIG. 6, which runs around with the belt or chain or rack on top and by means of the shaft 61 which is connected to a generator that produces electricity. By using a rack there is no need for gears on the bottom of the H-bar.

FIG. 7A and 7B shows a profile rod 2 with a H-shaped cross section with a wire 20 and a rack 71 where the wire and tooth rod goes through the U-shaped chamber 72 on the H-bar.

Figure 8A:
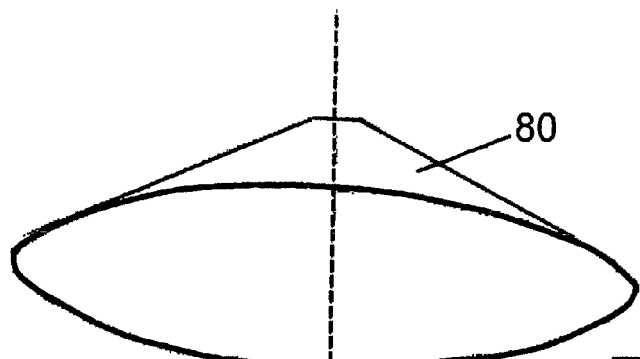
FIG. 8a, 8b, 8c show preferred float designs.
Figure 8B:
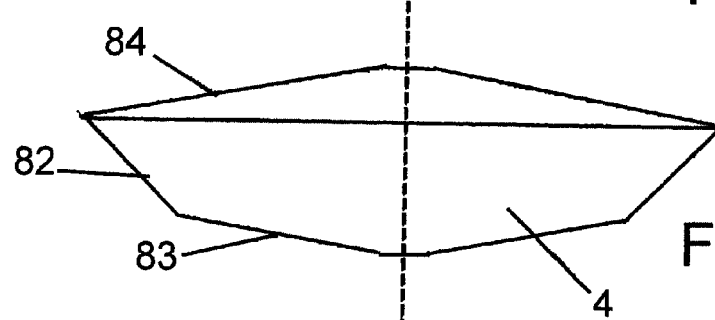
Figure 8C:
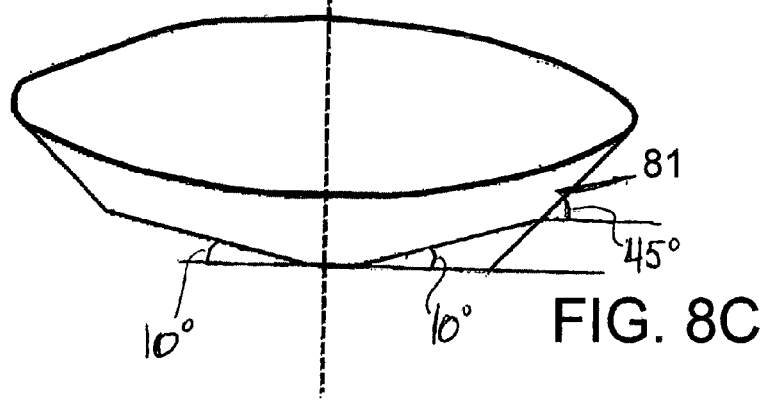

FIG. 8B shows how a float 4 can be designed and constructed. FIG. 8A and 8C shows the structure of the top and bottom of the float 8B.

To have a solid and functional float, i.e. a float with great buoyancy capacity (volume), its form with respect to the lifting properties and may provide less lateral resistance when the waves hit from the side, is decisive. At the same time it must be economically affordable and easy to produce and be robust against wear and tear. Alternatively there is no need for internal truss or beam construction.

It is known that a rounded cone-shaped surface is much stronger and not that flexible compared to a flat plate with the same thickness.

In FIG. 8B is the float shown constructed with a convex cone under the surface 83 with an arbitrary small angle of 10° (degrees) from the middle of the float and beyond with regard to the water line and a conic surface concave No. 84 with an arbitrary angle such as 10 degrees from center and outwards and there is welded between the two above and below the surfaces with a slanted wall No. 82 with 45 degrees to the waterline to prevent lateral support from the waves and therefore the waves are conducted under the float to lift them up and thus provide a better effect.

In the middle of the float is welded a rod chamber No. 90 with elongated wheel bearing 60 mounted inside to lead the H-shaped guide rod through.

All floats forming an inner chamber filled with air, and which can ballasted and filled or drained of water. It would appear from the FIGS. 8a-c that the float may have a disk shape.

Figure 9:
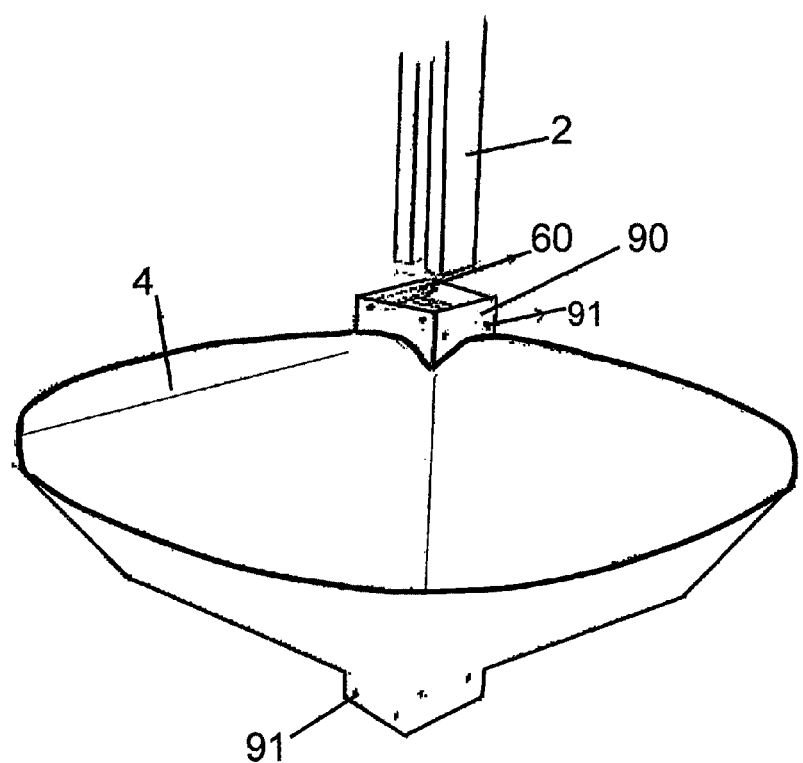
FIG. 9 shows the details of how the float is supported to the rod.

FIG. 9 shows the float chamber 4 with 90 for the insertion of the H-shaped profile bar 2. Chamber 90 flange edges projects outwardly from the bottom and upwards in the top of the float 4 and facilitates opportunities for change and maintain the wheel bearings in the mounting chamber.

Wheel bearings (rolling bearings) that are mounted at each end of the rod chamber 90 can be replaced by a kick out or removing pins 91 that make up the axle of the wheel bearing 60.

Figure 10A:
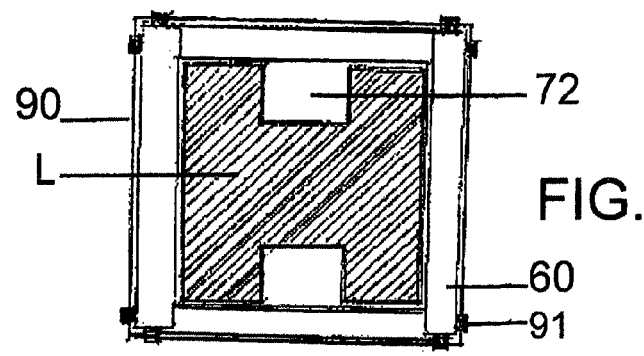
FIGS. 10a, 10b and 10c show various construction details of the rod, its cross-section adapted to the implementation through the float.
Figure 10B:
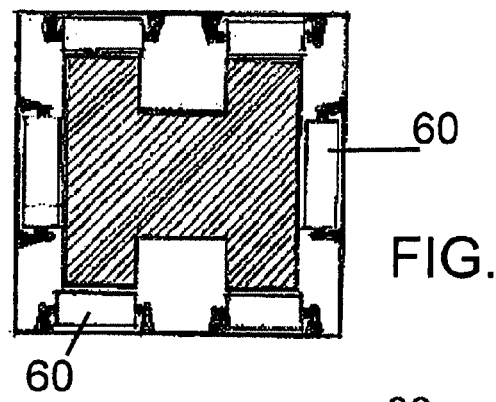
Figure 10C:
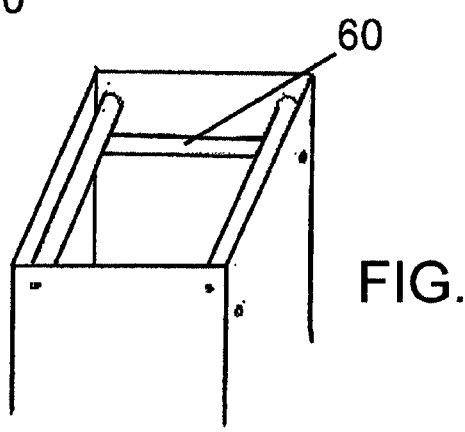

FIGS. 10A, 10B, 10C show different embodiments of the rod forms 2 and the rod chamber where the reference number 60 represents the wheel bearings and the shaded area indicates the H-profile shaped rod 2 while reference number 90 indicates the rod chamber.

Wave Power Plant with Windmill.

FIG. 11 shows an alternative construction of the float rig 1, where a windmill 200 is mounted to the same rig structure as in FIG. 1, where the mast 110 goes through the deck 1 and through the main float tank 6 and can be displaced upward and downward by means of a gear of a Power drive/motor No. 113 attached to the deck, and that drives sprocket wheel which forms the interference with a toothed rack 111 in the mast structure 110.

The float tank 6 includes a central continuous channel 220, see FIG. 11, and the elongated mast 110 to a wind turbine 200 with turbine blades 220 is mounted extending through the channel. The mast can be moved up and down the channel, i.e., relative to the tank, in that the mast is designed to slide upward and downward along rails in the frame work of the float tank out onto the slide opening, and the construction includes a drive unit for this. This may for example include a gear drive by a drive motor mounted on top of the overflow tank 212

One can install the generator of the windmill 112 at the deck 1 and the transfer/transform the propeller movement by means of a belt or chain or shaft to the generator inside the deck housing 112. The drive motor 113 includes tooth sprocket (not specifically shown) that is designed to work on a rack and pinion design 111 in the mast exterior. Thus, the mutual relative vertical position of the mast in relation to the float tank is regulated, up and down. Such drive bodies can be mounted in pairs and acting on the diametrically opposite teeth rings on the mast's outer surface, thereby creating balance. It can also be mounted several such drive systems to drive further down inside the tank, thus improving the balance when the mutual position between the tank and the mast should be changed.

Since the pole is anchored to the seabed via a cable, and floating tank has a certain buoyancy, the tank's maneuverability in relation to the mast, my be used to regulate the tension of the cable.

The cable 15 that is attached to the seabed is attached to the bottom 202 of windmill tower 200 and protrudes from the bottom of the float tank 6

In the case of storm that can cause harmful movements on the structure, one can disconnect the generator from the power drive of the windmill 200 and slide the pole downward to a minimum height to reduce the wind forces and stresses to the structure or sliding down the pole without having to disconnect from the generator and thus lowering the height of the propellers to obtain a less stress on both the propeller and on the generators and the construction while the the power production continues.

Figure 12:
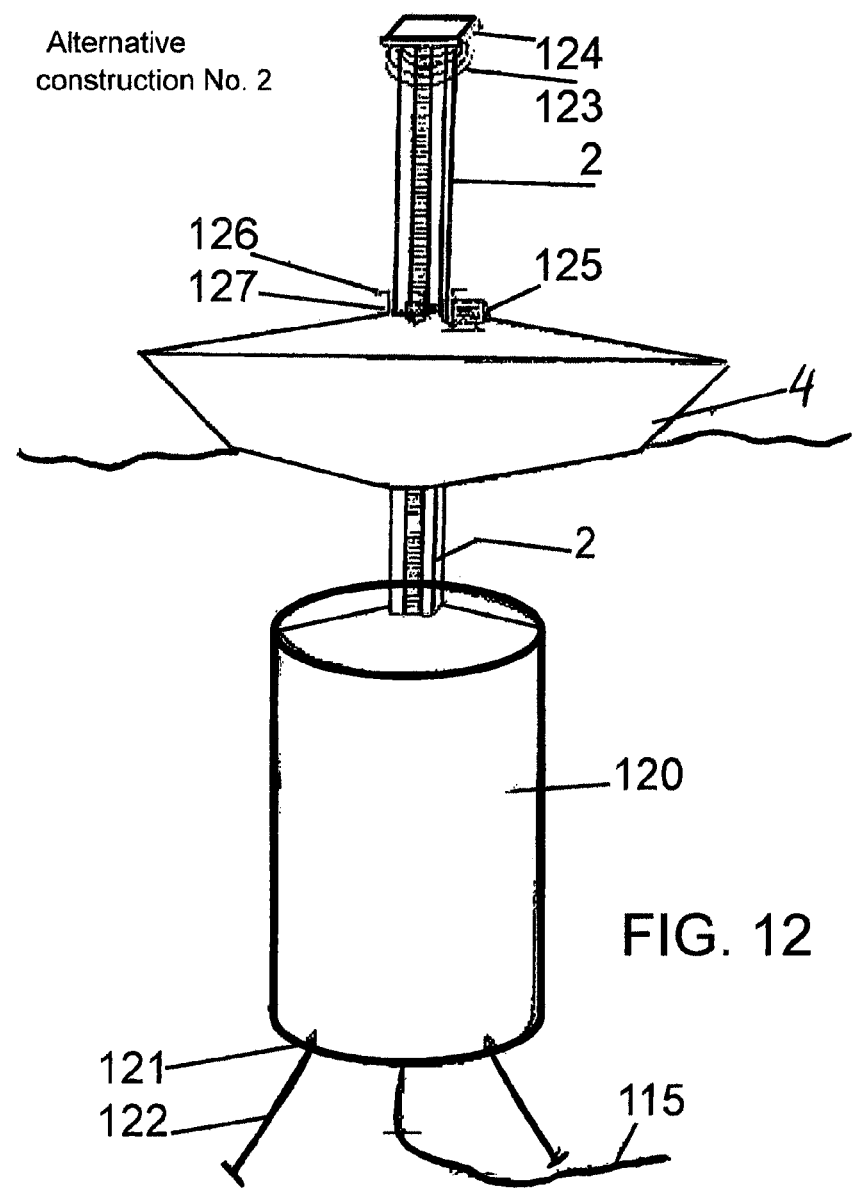
FIG. 12 shows an alternative placement of a float tank.

The alternative structure 2 shown in FIG. 12 shows a flotation tank 120 with a lead rod 2, in this case an H-profile shaped rod mounted in the center through the entire height of the tank 120 inside and welded to the bottom and top of the float tank 120 and immersed into the sea. The float tank is a watertight tank to form an air-filled chamber.

The buoyancy of the float tank must be several times greater than the weight of the entire structure so that buoyancy forces can overcome the torque forces from the float in a widespread inclination and force them back to vertical position.

The conducting rod 2 has a limited length and a block 124 in the form of an stopper plate 124 or bolt-on top not allowing the float 4 to jump out of the rod 2 when big waves occur, and a spring No. 123 is mounted under the barrier plate 124 to make all the impact forces softer between the float no. 4, and stopper plate 124

Flotation tank 120 is attached to the seabed by means of at least 3 pieces of cables 122 to respective attachment points 121 around the circumference of the underside of the floating tank 120 to avoid the float tank forming circular movements in the sea when it is pressed down by the float 4 in an inclined forward direction condition on the way back to its original upright condition.

The generator 125 is mounted on the top surface of the float 4 and is connected to the rack via a gear no. 127. On the float 4 is mounted one or more upward extending spacers 126 to prevent the sprocket and the generator abut against the spring 123. The power cord 115 extends down to the underside of the tank 120 wherein it is supported by an elastic band, like a rubber band, to a spring-loaded coiling drum, that can spool out or rewind the power cord and follow float movements up and down. The power cable 115 extends from the top and throughout the construction to the middle of the float tank to the sea floor and to the shore utilization of the power. As shown the float tank is submerged and anchored below the sea surface so that the float 4 in a through of the sea, does not hit the float tanks 120 and 16 from above.

Figure 13:
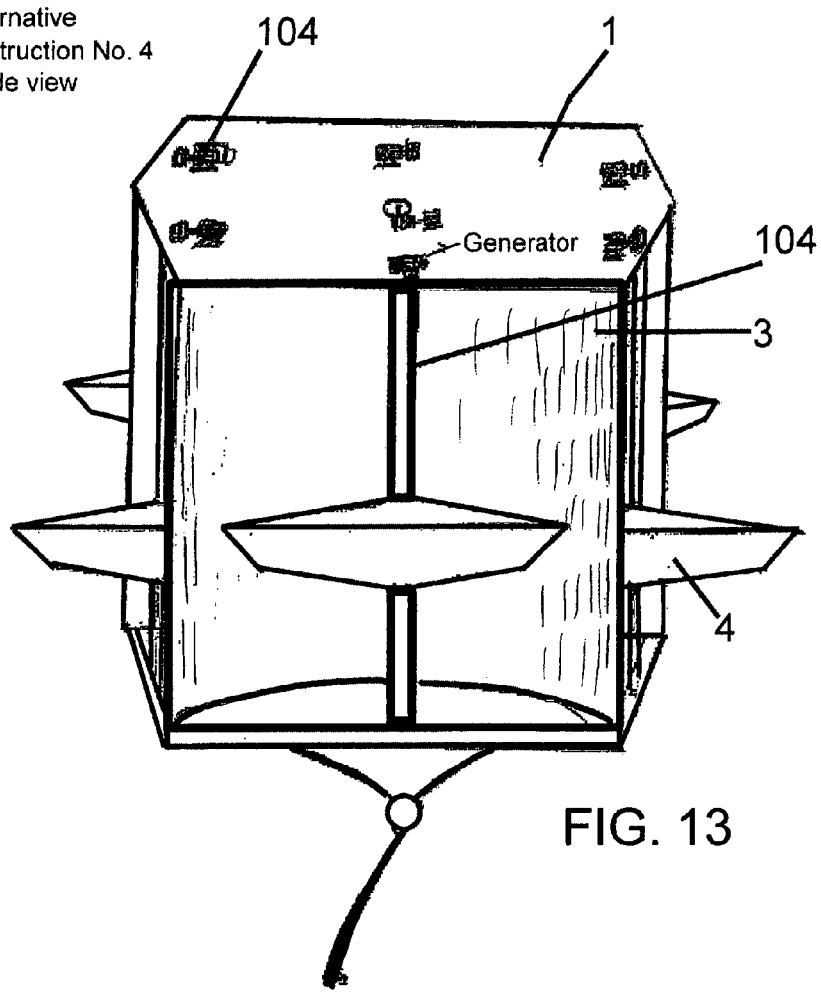
FIGS. 13 shows a perspective of an alternative construction of the float tank and the connection of the float to it.
Figure 14:
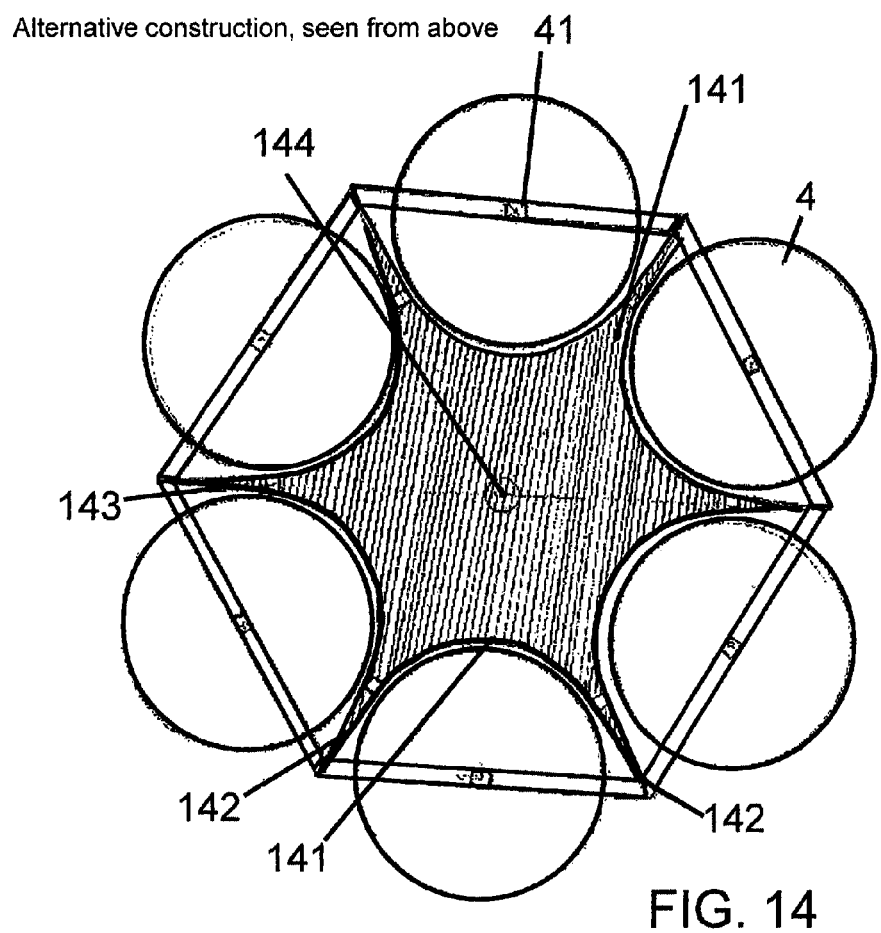
FIG. 14 shows the construction of FIG. 13 in a plan view from above, and how the floats are recessed into the semicircular concave depressions in the float tank.
Figure 15:
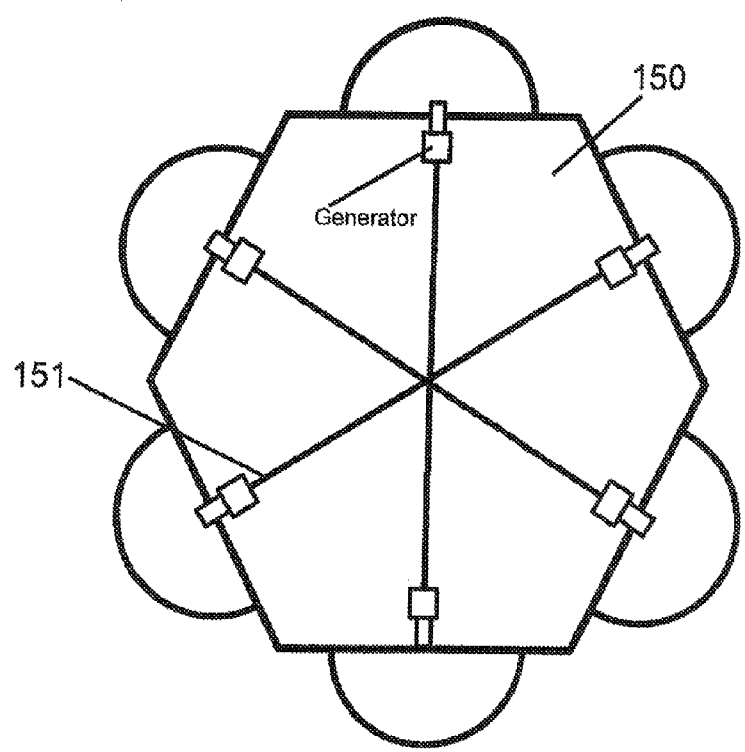
FIG. 15 shows an alternative construction of FIG. 14, showing the generators and power wires.

FIGS. 13, 14 and 15 show an alternative third construction of the wave energy plant according to the invention.

The float tank 140 is designed so that each float 4 is designed with semicircular depressions 141 adapted to the circular float perpherial contour, and so it can move up and down with help of the leader rod 2 which is mounted between the upper and lower beams, which is mounted on the bottom and top on the end of the half circle shape at 142.

The FIG. 13 shows the generator 104 which is mounted on top of the deck 1 and connected to the shaft 61 on top of the guide rod 2. The behavior is exactly as described in FIG. 3 with the drive chain, belt, wire, rack variants.

Figure 16:
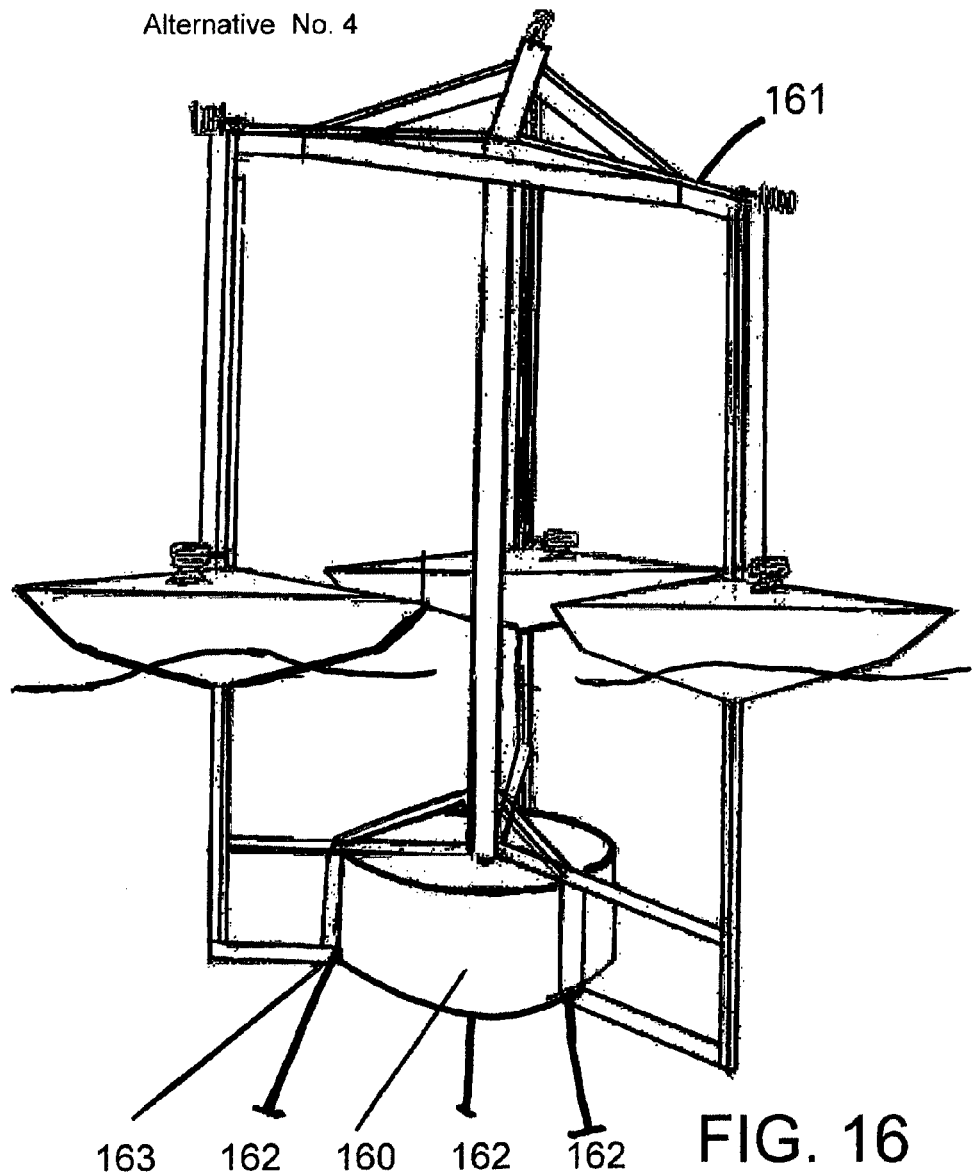
FIG. 16 shows a side view of an alternative construction.
Figure 17:
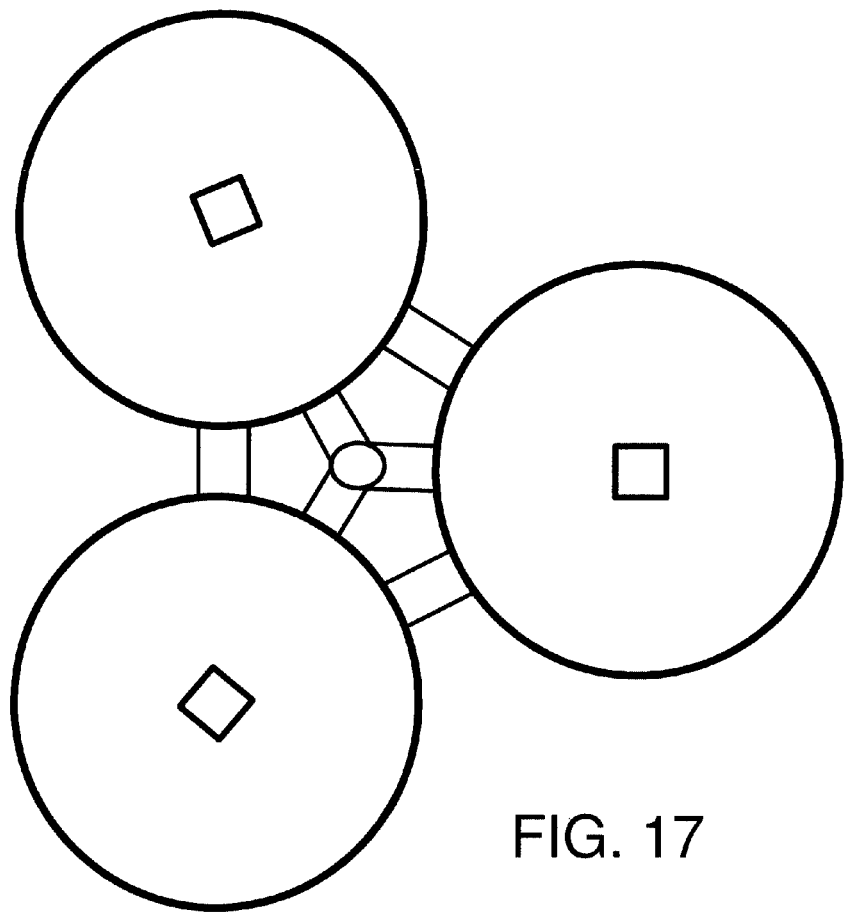
FIG. 17 shows an outline plan of the structure in FIG. 16

In the middle is a pipe opening running from bottom to top that attach cables to the seabed extend through so one may control the anchoring, and power wires 151 passes through to the seabed and ashore while one can mount the windmill on the structure in the same manner as shown in FIG. 11.
FIGS. 16 and 17 Show an Alternative Paragraph 4 More Floats.

In this case, a structure with three float preferred as shown in perspective view in FIG. 17 where each float 4 moves up and down in waves on their respective guide rods 2. A generator is mounted on each float 4. At least 3 fixing cables 162 with a mutual spacing are fixed to the edges of the bottom of the float tank 160 at point 163 on the float tank.

The rig, according to the invention, is adapted to float into the sea either by means of one or more float chambers 6 and in some cases it is lowered below sea level, or by the rig framework (base) itself comprises hollow pipe parts so that it floats in the sea. In FIG. 1 the sea surface is given by S, in that the illustration shows the rig with disc 1 in a perspective view.

When for example a storm occurs, the wind catcher is pulled down and thereby the torque forces are reduced to a considerable extent, and one can partially charge the float to give a slower motion. In extreme cases the floats may be arranged in their highest point under the deck 1, when float tank 6 is immersed deeper.

If the pivoting movements are too strong, and under unfavorable weather conditions, there is a risk that the rig is pivoted completely over and lies at an slanted angle or flat down so that the tank 23 touches the sea surface. Then there is an obvious clear advantage that the air-filled tank in the upper part of the rig tower will prevent the rig from overturning if the rig attachment (wire/cable) in the bottom breaks, and the construction fluctuates greatly over and remains virtually flat.
Mode of Operation.

Wave power plant is put into the sea and floats using the float tank 6, or the like, so that the moving floats 4 are basically floating in the water surface. At wave and swells at the sea, the floats are pushed so that they individually starts to move along the rod 2 and drives their respective generator. All 6 float moves independently of each other.

In the case of construction shall be transported and moved from shipyard to sea where it will be installed, the float tank is filled so that it sinks into the sea so that the entire structure rests on all the floats 4 and is towed to the destined position where float tank 6 is emptied so that the whole construction floats to the sea surface and is anchored.

The invention claimed is:

1. A device of a power plant for the production of utilizable energy of waves comprising: a rig configured to float in the sea, said device having a supporting construction for a number of floats (4) which are arranged in a ring shape around the rig circumference with spacing between the floats (4), in that the motion of each of said floats due to the affection by waves, is brought to power generators to produce energy for further exploitation, and the device is provided with a means to transport produced electricity to land or other application for utilization, wherein each float (4) is adapted to operate its respective generator via a transmission system including an elongated rod-shaped body (2) extending centrally through the float (4), and to which said float is designed to move up and down along affected by said the waves, and is arranged to move means (3,20,72) to rotate its respective generator shaft (61) on a rig deck (1), each float (4) comprises a circular disc exhibiting a downward concave curved form (81,82,83), wherein the rig is brought to float on the sea surface using a rig or float tank (6) arranged centrally in the supporting structure, and/or that the supporting construction includes beams and rod (15) elements that are waterproof and has a buoyancy that gives the rig necessary buoyancy, the rig is anchored to the seabed via an anchoring cable (15), and a winch system is arranged, which winch system is designed to keep the floats (4) at correct height position in relation to tide level and securing the plant in storm.

2. The device according to claim 1, wherein that rig comprises a tower (22), the top of which includes a wind catcher unit (21) to exploit wind power to pivot the rig from side to side, and by this moving the rig relative the floats (4) and inducing rotation of the respective generator shaft (61) by means of the transmission system.

3. The device according to claim 1, wherein the float tank (6) can be adjusted so that it lies at or below the sea surface by tensioning the anchoring cable (15).

4. The device according to claim 1, wherein said means (3,20,72) to rotate the generator shaft (61) includes tooth belt (3) or/wire (20) or rack (71).

5. The device according to claim 1, wherein the transmission system and generators are arranged in connection with a housing section on a mounting plate (1), and where the elongated rod-shaped bodies (2) with their associated float, extend down on the underside of the plate (1).

6. The device according to claim 1, wherein the floats (4) and elongated rod shape body are mounted in between the upper and lower horizontally outwardly extending assembly seats (5,5A, respectively 40,41).

7. The device according to claim 1, wherein the floats (4) are formed by a thick circular disc so that upward-facing surface (80) of the float (4) forms a concave curved downward, and bottom of the float (4) is convex with two convex parts (81) with different slope degrees, in that lower convex portion (83) is to strengthen construction of the float (4) and upper convex portion (82) creates a buoyancy volume for the float (4) and also angle relative to surface of water guiding waves under the float (4) to lift it.

8. The device according to claim 1, wherein each float (4) includes through-hole (90) in the middle with wheel bearings (60) adapted so that the elongated rod-shaped body (2) can scroll through and the float (4) is a hollow/airspace that can be ballasted with water.

9. The device according to claim 1, wherein the float (4) is designed for mounting to the elongated rod-shaped body (2) for movement up and down the elongated rod-shaped body where it can move a rack (71) or strap/wire (3,20) to rotate a general shaft (61) connected to a power-producing generator.

10. The device according to claim 1, wherein the float tank (6) on its outside around the perimeter is designed with a number of concave semi-circular in/depressions (141), wherein the floats (4) are designed to work by up and down movement in respective recess along the elongated rod-shaped body (2).

11. The device in accordance with claim 2, wherein the wind catching surfaces of wind catcher unit (21) are made of stretched canvas, plastic or canvas fabric, such as used in sails, and is provided with extending flaps (55) on the wind catching surfaces.

12. The device according to claim 2, wherein the upper part of the tower (22) includes a float element (23), where the float element (23) is integrated with wind catcher unit (21) in that the wind catcher unit (21) is arranged enclosing around outer surface of the float element (23).

13. The device according to claim 2, wherein the wind catcher unit (21), and possibly including the integrated float element (23), is arranged to move up and down along the tower (22), in that the wind catcher unit (21) is mounted to a carnage or trolley (56) sliding up and down along the tower (22) and a winch (54) used to lift the wind catcher unit/float element (21,23) via a wire (51) running over a pulley (50) at the top of the tower (22).

14. The device according to claim 1, where the power plant is also designed to utilize wind energy, wherein the float tank (6) is designed with a mast (110) of a wind turbine which by means of a motor (113) and pinion (11) which is fixed on one side of the mast (110) moves up and down, in that the mast (110) is arranged to slide up and down and out below the float tank (6) through a central channel (220) in the middle of the float tank (6) and end (116) of the mast (110) is anchored to the seabed with a cable (15), and the mast (110) stops when a stop element (114) hits the rig deck (1).

\* \* \* \* \*